(12) United States Patent
Daniels

(10) Patent No.: US 7,162,790 B1
(45) Date of Patent: Jan. 16, 2007

(54) FASTENER AND METHOD FOR SUPPORTING ELONGATED MATERIAL

(76) Inventor: David Orlen Daniels, 409 Sawmill Run Rd., Butler, PA (US) 16001

( * ) Notice: Subject to any disclaimer, the term of this patent is extended or adjusted under 35 U.S.C. 154(b) by 365 days.

(21) Appl. No.: 10/856,241

(22) Filed: Jun. 1, 2004

(51) Int. Cl.
*B23P 11/00* (2006.01)
*F16L 3/08* (2006.01)
*H02G 3/32* (2006.01)

(52) U.S. Cl. .............. 29/525.01; 248/74.2; 248/49; 248/60; 248/67.5; 29/525.02; 29/525.04; 174/40 R; 174/40 CC

(58) Field of Classification Search ............ 248/49, 248/58, 60, 61, 62, 63, 65, 67.5, 67.7, 68.1, 248/69, 72, 74.2, 74.4; 174/40 R, 40 CC; 29/525.01, 525.02, 525.04, 525.08, 525.11
See application file for complete search history.

(56) References Cited

U.S. PATENT DOCUMENTS

| | | | |
|---|---|---|---|
| 1,971,396 A | | 8/1934 | Waide |
| 2,338,145 A | * | 1/1944 | Webb .................... 174/40 CC |
| 2,340,560 A | * | 2/1944 | Rempt .................... 174/40 CC |
| 2,352,823 A | * | 7/1944 | Ray .......................... 248/74.3 |
| 2,355,115 A | * | 8/1944 | Schmidt .................... 248/74.3 |
| 2,355,742 A | * | 8/1944 | Morehouse ................ 248/68.1 |
| 2,366,041 A | * | 12/1944 | Morehouse ................ 248/74.3 |
| 2,399,899 A | * | 5/1946 | Tinnerman ............. 174/40 CC |
| 2,406,572 A | * | 8/1946 | Vogl ........................ 149/109.4 |
| 2,413,772 A | * | 1/1947 | Morehouse .................. 24/457 |
| 3,376,004 A | * | 4/1968 | Goldman .................... 248/74.3 |
| 3,815,855 A | * | 6/1974 | Appleton .................... 248/74.3 |
| 3,906,592 A | * | 9/1975 | Sakasegawa et al. ...... 248/68.1 |
| 4,170,995 A | | 10/1979 | Levine et al. |
| 4,183,485 A | * | 1/1980 | Gladieux .................... 248/68.1 |
| 5,188,318 A | | 2/1993 | Newcomer et al. |
| 5,201,484 A | | 4/1993 | Thoen |
| 5,612,509 A | | 3/1997 | Market |
| 5,743,497 A | | 4/1998 | Michael |
| 6,079,673 A | * | 6/2000 | Cox ............................ 248/63 |
| 6,378,813 B1 | | 4/2002 | Gretz |
| 6,666,415 B1 | * | 12/2003 | Hansen ...................... 248/74.3 |
| 6,726,166 B1 | * | 4/2004 | Goodman ............. 248/229.14 |
| 6,732,982 B1 | * | 5/2004 | Messinger .................. 248/74.1 |
| 6,732,983 B1 | * | 5/2004 | Blake et al. ................ 248/74.2 |

* cited by examiner

*Primary Examiner*—Essama Omgba
(74) *Attorney, Agent, or Firm*—Aileen Champion Addessi

(57) ABSTRACT

A fastener for mounting elongated material, such as cables and wires, to a supporting structure includes a major body portion having an aperture for receiving elongated materials of various dimensions, and at least one anchor bore through which an anchor is inserted for securing the fastener to the supporting structure. The fastener also includes a prong that is engagable with the anchor for preventing the major body portion from slipping off the anchor. The fastener may include a flexible base member for receiving the elongated material, or the fastener may includes a wire tie slot through which a wire tie can be passed for holding multiple pieces of material in position. The method of installing the fastener includes securing the anchor to the supporting structure, and then sliding the major body portion, with the elongated material positioned within the aperture, onto the anchor.

31 Claims, 8 Drawing Sheets

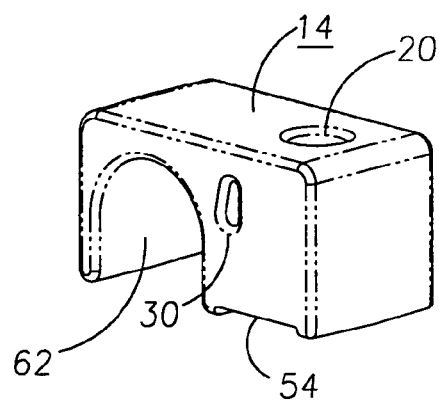
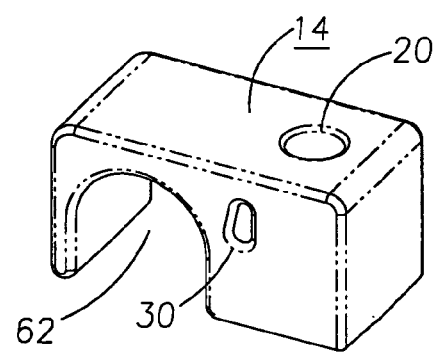
FIG. 11  FIG. 12
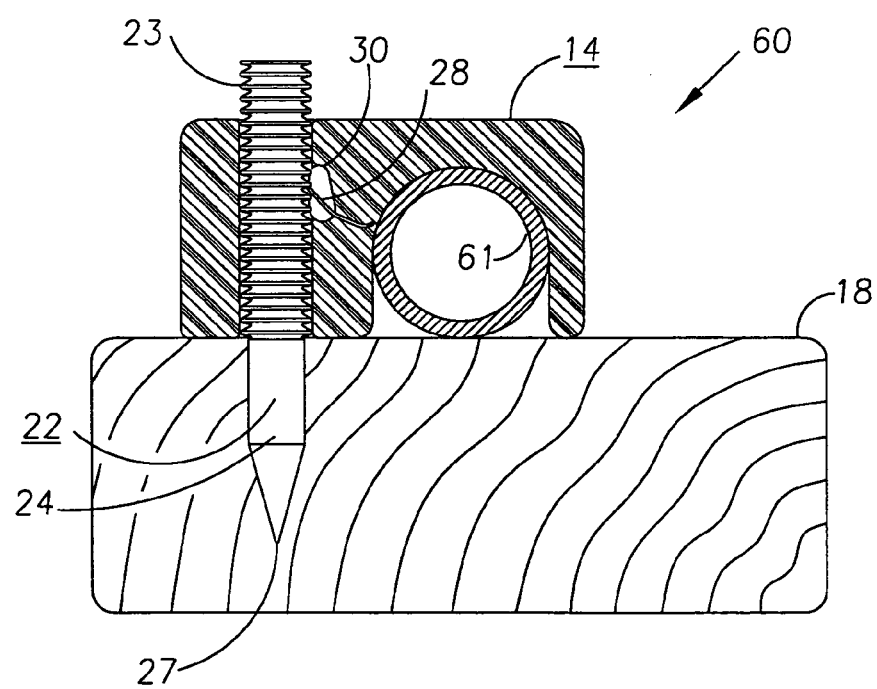
FIG. 10

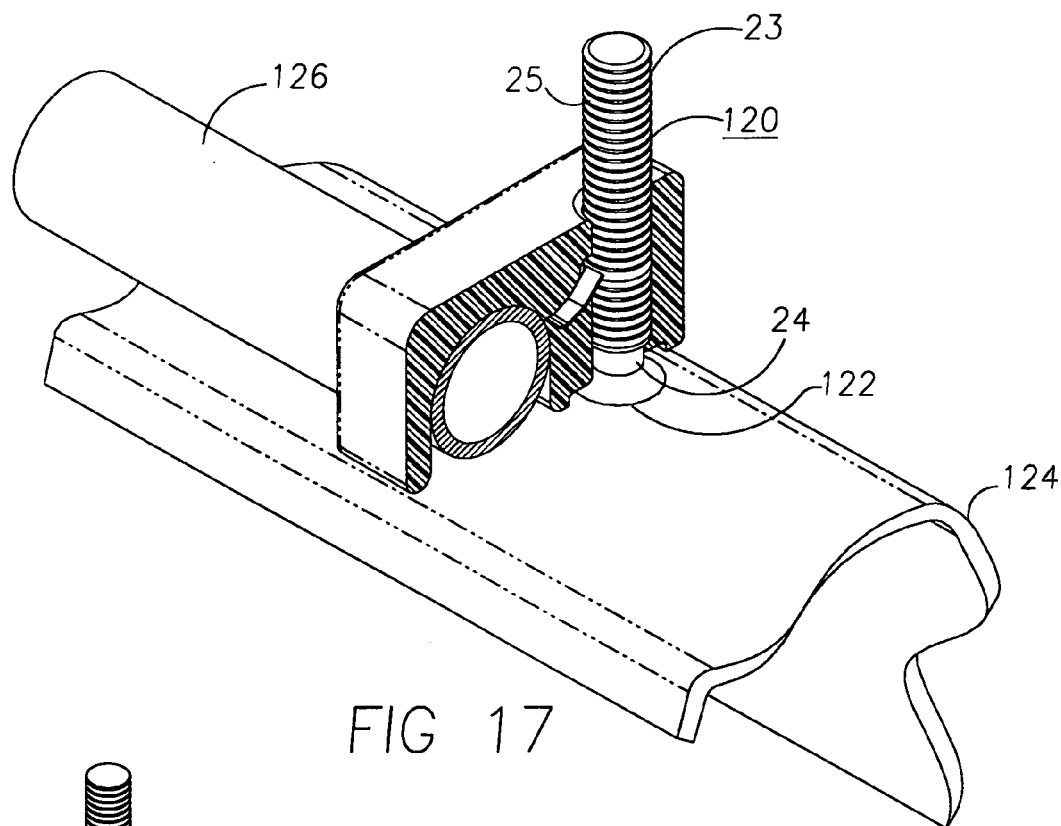
FIG 17
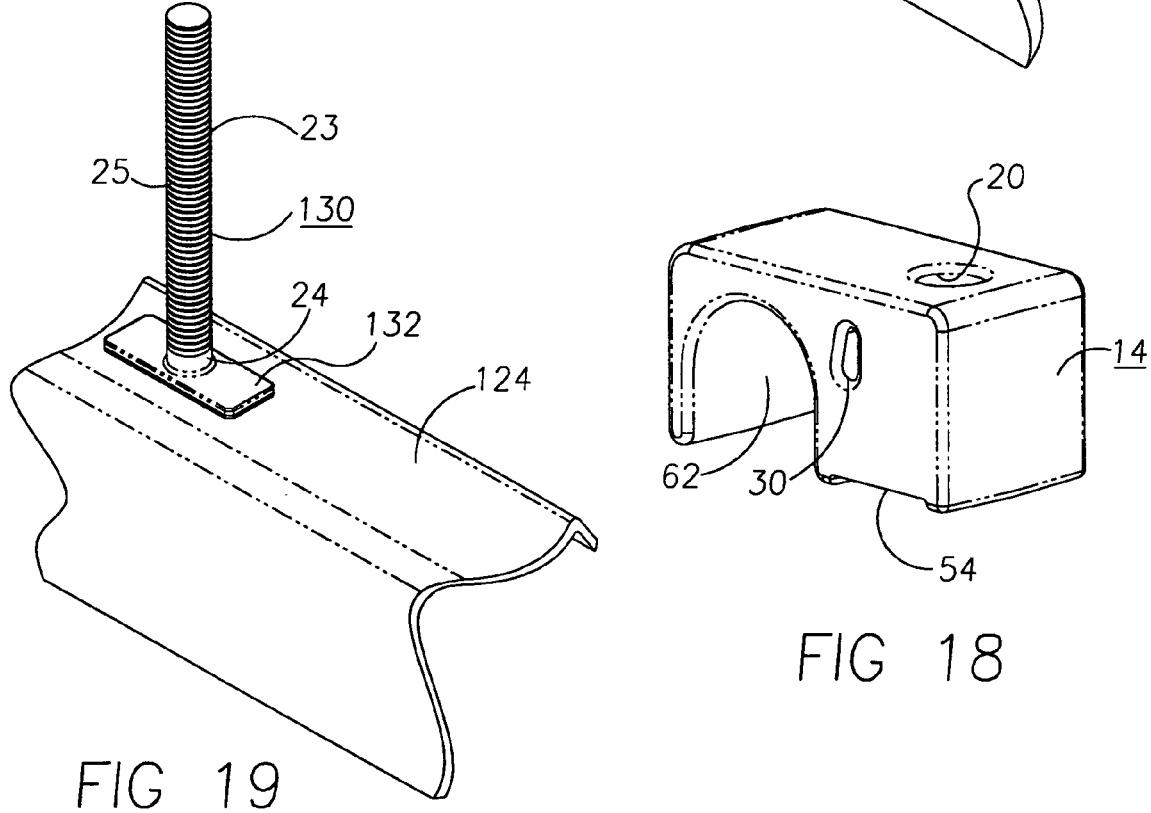
FIG 19
FIG 18

FASTENER AND METHOD FOR SUPPORTING ELONGATED MATERIAL

BACKGROUND OF THE INVENTION

The present invention relates to supports for cables, wires, tubing, conduit, or the like, and more particularly pertains to fasteners for holding cables, wires, tubing, conduit or the like, in position in their extension or run adjacent and along ceilings, walls, and other surfaces and structures.

A number of factors must be considered in running, hanging or extending cables, conduit, tubing, electrical wiring, or the like in residential, commercial, automotive, and industrial settings. A foremost consideration is from what type of structure or surface are the supports for the wires to be pendent from or attached to. Structures and surfaces may be of stone, metal, concrete, wood, or girders and beams of iron, such as I-beams, or the like. For some of these structures and surfaces, it may not be desirable, practical or even possible to drill or infix the wire supports in position with nails or studs; each application will necessitate a specific method or technique for mounting the wire supports to the given structure or surface.

In addition, the location through which the wires or cables are to be extended and the wire supports mounted must also be considered. Running electrical wiring from a main junction box to a game room in a residential dwelling is quite different from running conduit and cable throughout a commercial department store or machine shop. Also, the span or area through which the wires or cables are to be run must be considered: running electrical wiring and cables horizontally along the ceiling of a warehouse presents fewer impediments than running electrical wiring and cable from a basement entrance box to the various floors of a renovated multi-story apartment dwelling wherein the wiring and cable must navigate through and around all manner of objects and hindrances from outmoded wiring and firewalls to old heating, water and ventilation pipes and plumbing. Furthermore, electrical wiring and cable come in different diameters or gauges, and in a given application it may be efficient and economical to stack wiring and cables of different gauges. Therefore, the fasteners need to include apertures of different diameters or gauges to receive and accommodate the various sizes of wire or cables, and preferably the fasteners should include features that allow for the stacking of the fasteners.

In view of the above considerations and problems, the prior art discloses a number of designs and configurations for supports, clamps, and clips for supporting wiring, conduit and cable in their extension or run along walls or pendent from ceilings.

For example, the Waide patent (U.S. Pat. No. 1,971,396) discloses a disc capable of being affixed to the wall of a cabinet by cementitious material, the disc having an aperture for receiving a screw bolt to which fixtures can be mounted or on which they can be supported.

The Levine et al. patent (U.S. Pat. No. 4,170,995) discloses a catheter clamp that includes an adjustable jaw mounted on a circular base by a post for holding the catheter, and the base being affixed to the patient by an adhesive applied to the lower surface of the base.

The Newcomer et al. patent (U.S. Pat. No. 5,188,318) discloses a clip body that mounts to the sidewall of a stud by various means such as by staples or nails, and from which clips project for receiving and holding therein different forms of wiring.

The Theon patent (U.S. Pat. No. 5,201,484) discloses a clamp for supporting cables and which includes a pair of laterally depending latching hooks, with the latching hooks of one clamp capable of interlocking with the latching hooks of a clamp disposed immediately above or below for stacking and locking the clamps together.

The Market patent (U.S. Pat. No. 5,612,509) discloses wire holding straps that are stackable one upon the other with the legs of one strap including serrated prongs that are inserted into the upwardly open bores of a subjacent strap for interlocking the straps to each other.

The Michael patent (U.S. Pat. No. 5,743,497) discloses a wire holding strip that includes an elongated base having a plurality of unshaped hooks spaced therealong with each hook capable of receiving and holding therein one wire.

The Gretz patent (U.S. Pat. No. 6,378,813) discloses cable supports that are stackable one on top of another wherein each cable support includes opposed legs that have screw holes extending therethrough so that the screw holes of one support can be aligned with the screw holes of subjacent or superjacent cable supports.

Nonetheless, there remains the need for a fastener that can accommodate cables or wires or other elongated types of material of different sizes or gauges, can be affixed or mounted to surfaces, ceilings, and walls by various techniques, and includes features that prevent the fastener from working free of anchors that mount the fastener to the particular surface, ceiling or wall.

SUMMARY OF THE INVENTION

The present invention comprehends several embodiments of a cable and wire support or fastener for securing and fastening cables and wires or the like to ceilings, walls, beams, girders, panels, and other mechanical structures and devices. While each of the various embodiments has certain distinctive features, all the embodiments include common elements among which is a major body portion encompassing an aperture into and through which a cable or wire is inserted, and at least one anchor bore extending through the major body portion through which an anchor is inserted. In addition, the aperture diameters for the several embodiments can be configured and sized to receive cables and wires of different diameters and gauges. Various embodiments include a flexible flap or prong that extends partially into the anchor bore for allowing the anchor to freely pass through the anchor bore, but that prevents the major body portion of the fastener from becoming loose and working free of the anchor. The anchor diameter and length of the anchor can be sized and configured according to the weight that the anchor is supporting and to the number of fasteners to be stacked on one another. The diameter of the anchor bore can be sized and configured according to the size of the anchor.

It is an objective of the present invention to provide a cable and wire fastener wherein several embodiments of the cable and wire fastener can be stacked one on top of the other, the same anchor to support wires of different dimensions and gauges.

It is another objective of the present invention to provide a cable and wire fastener wherein the several embodiments of the cable and wire fastener can be used with drive, screw, bolt, weld, and glue-type anchors for supporting cables and wires of various dimensions and gauges.

It is yet another objective of the present invention to provide a cable and wire fastener wherein at least one embodiment thereof can receive and accommodate flat wire such as 12 gauge two conductor wire with ground.

It is still yet another objective of the present invention is to provide a fastener wherein the several embodiments include a flexible flap that engages the anchor after the anchor has passed through the bore for maintaining securement of the major body portion of the fastener to the anchor.

Yet a further objective of the present invention is to provide a cable and wire fastener that allows the individual to secure cables and electrical wires to a supporting structure without the need for using tools to mount the major body portion of the fastener to the anchors affixed on or into the supporting structure.

Yet a still further objective of the present invention is to provide a cable and wire fastener that secures the elongated material in the elongated material's extension adjacent the supporting structure but wherein the elongated material is not squeezed or over tightened in its securement to the fasteners.

These and other objects, features, and advantages will become apparent to those skilled in the art upon a perusal of the following detailed description read in conjunction with the accompanying drawing figures.

BRIEF DESCRIPTION OF THE DRAWINGS

FIG. 10 is a cross-sectional view of another alternative embodiment of the fastener illustrating a major body portion without having the base member;

FIG. 11 is a perspective view of the fastener of FIG. 10 having a recess;

FIG. 12 is a perspective view of the fastener FIG. 10 without having the recess;

FIG. 17 is a cross-sectional view of an alternative embodiment of an anchor having a weldable end for attachment to the supporting structure;

FIG. 18 is a perspective view of the major body portion of the fastener of FIG. 17;

FIG. 19 is a perspective view of an alternative embodiment of an anchor having a glue-on end.

DETAILED DESCRIPTION OF THE PREFERRED EMBODIMENT

Illustrated in FIGS. 1–20 are several embodiments for fasteners or brackets that are used to hold, maintain and suspend elongated material, for example, electrical and non-electrical cables and wires, such as house wiring, electrical wiring, coaxial cable, automobile wiring or accessories, tubing, such as flexible hose, or conduit, such as copper pipes, or any other items, from various supporting structures and surfaces such as walls, ceilings, studs, beams, girders, grids, panels, automobiles, and lattice-type framework of wood, metal, iron and concrete, or any other supporting structure or surface. All of the embodiments of the fastener are designed to be mounted to the supporting structure quickly and easily with a minimum of tools and expertise; and all of the fasteners can be used with various types of anchors, as will be hereinafter described, such as bolt anchors, screw-in anchors, drive anchors, anchors having a washer for delimiting anchor penetration into the supporting structure, glue-on, welded on anchors, or any other type of anchor. The anchors can be steel, nylon, steel with a nylon sheathing or cover, or any other suitable type of material. A primary advantage of the fasteners of the present invention is that in running wire from an entrance box throughout a dwelling, for example, wherein the wires are disposed pendent on the overhead supporting beams, the anchors can be first secured to the overhead beams, and then the major body portions of the fasteners are mounted to the anchors with the elongated material already running through the fasteners. Moreover, no tools are needed to mount the major body portions of the fasteners to the anchors.

Figure 1:
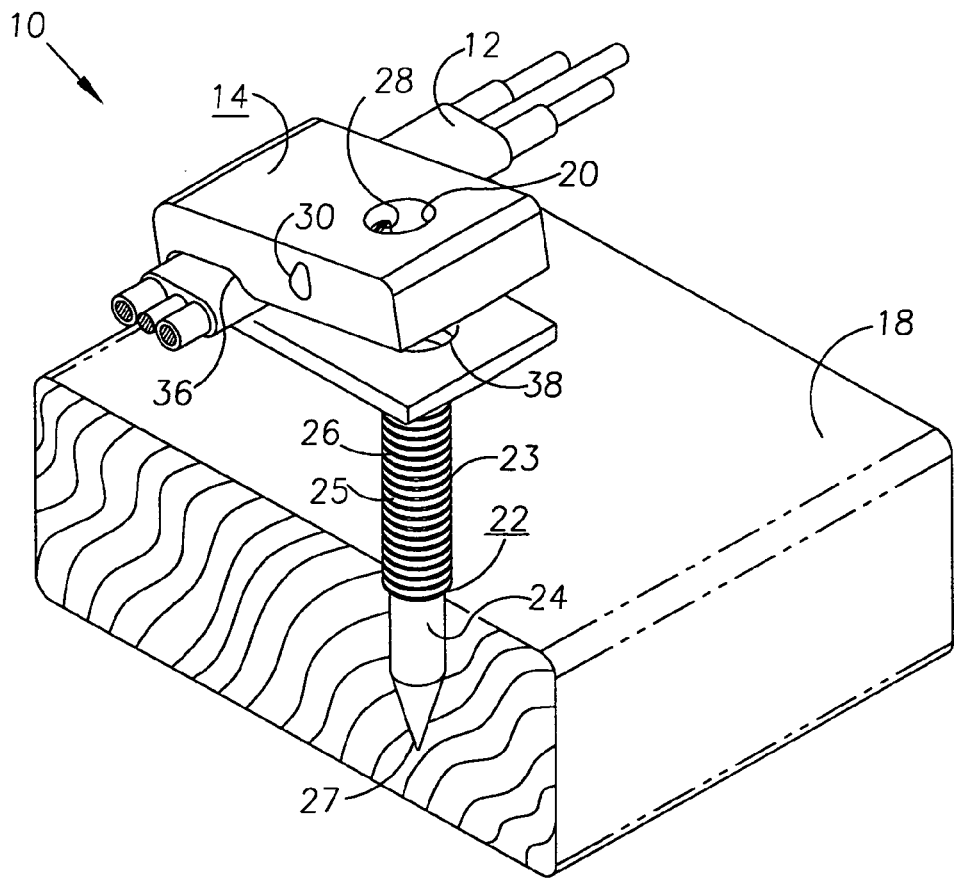
FIG. 1 is a perspective view of a fastener supporting an elongated material, such as a piece of wire, within a major body portion of the fastener and showing the major body portion disposable on an anchor having ring grooves and a nail type end.
Figure 2:
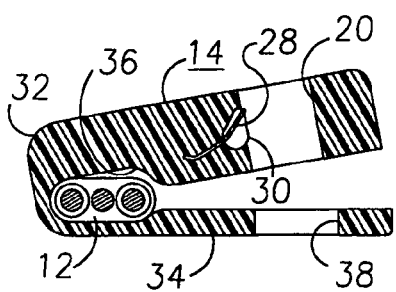
FIG. 2 is a cross-sectional view of the major body portion shown in FIG. 1.
Figure 3:
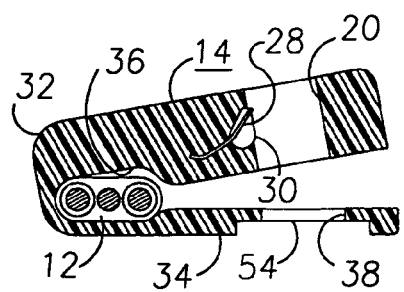
FIG. 3 is a cross-sectional view of the major body portion shown in FIG. 1 having a recess.

Illustrated in FIGS. 1–3 is one embodiment of a fastener. The fastener 10 of FIGS. 1–3 can be used to hold a wire 12, such as a 12-gauge two-conductor wire with ground, and includes a major body portion 14. The wire fastener 10 is shown disposed adjacent to a supporting structure that is a wooden beam 18. The major body 14 includes a generally cylindrical anchor bore 20 extending therethrough for receiving an anchor 22.

Figure 4:
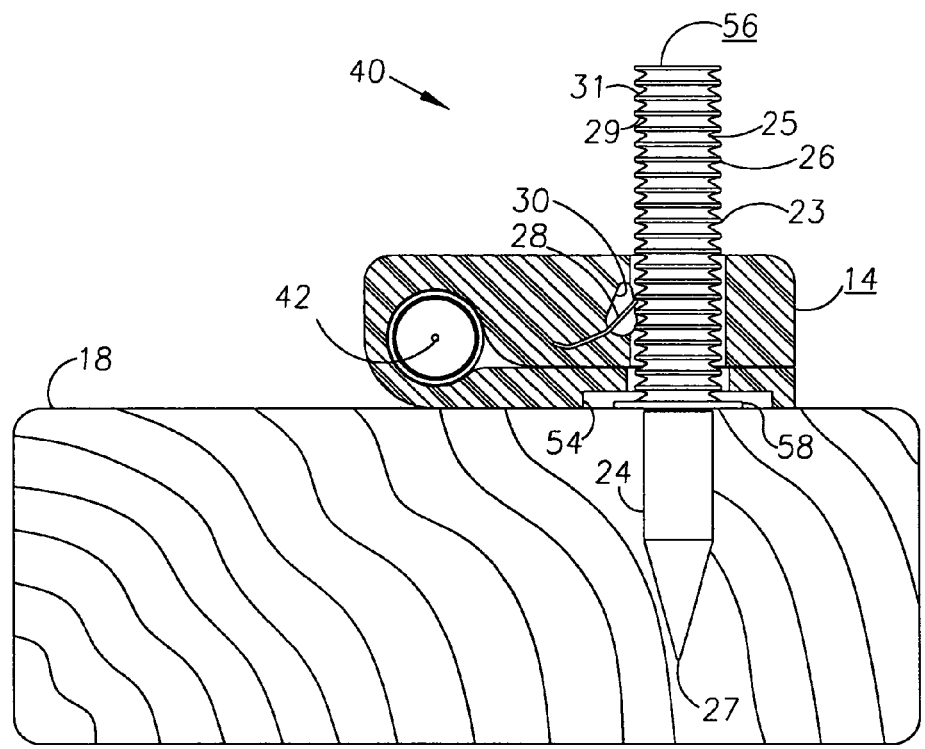
FIG. 4 is a cross-sectional view of an alternative embodiment of the fastener illustrating the major body portion of the fastener having a differently shaped wire aperture and the anchor having a washer.

The anchor 22 includes a first portion 23 and a second portion 24. The first portion 23 is a shank having ring grooves 25 with teeth 26. As illustrated in FIGS. 1, 4 and 10, the second portion 24 may be a cylindrical shaft with a pointed end 27, such as a nail, or alternatively, may have a different configuration as will be discussed hereinbelow. The teeth 26 of the first portion 23 have a first flat surface 29 and a second angled surface 31. The angled surface 31 allows the anchor 22 to be insertable through the anchor bore 20 and the flat surface 29 enables engagement with the prong 28 of the major body portion 14.

The major body portion 14 includes a one-way movement restraint prong or flap 28 extending at least partially into the anchor bore 20, and mounted within or integrally attached to the major body portion 14. The flap 28 is preferably of a spring steel composition or the like. The flap 28 is pliable to allow the wire fastener 10 to be placed on the anchor 22, and engages the ring grooves 25 of the anchor 22 for preventing the wire fastener 10 from slipping off the anchor 22 from its own weight (especially if the wire fastener 10 is mounted pendent on the supporting structure such as the overhead beam 18). To release the wire fastener 10 from the anchor 22, it must be possible to move or lift the flap 28 to a release or disengage position, and this is accomplished by a release hole 30 extending at least partially through the major body portion 14 for registration with the anchor bore 20. A pry tool (not shown) can be inserted through the release hole 30 for physically disengaging the prong or flap 28 from the anchor 22 thereby releasing the fastener 10 from the anchor 22

Figures 5, 6:
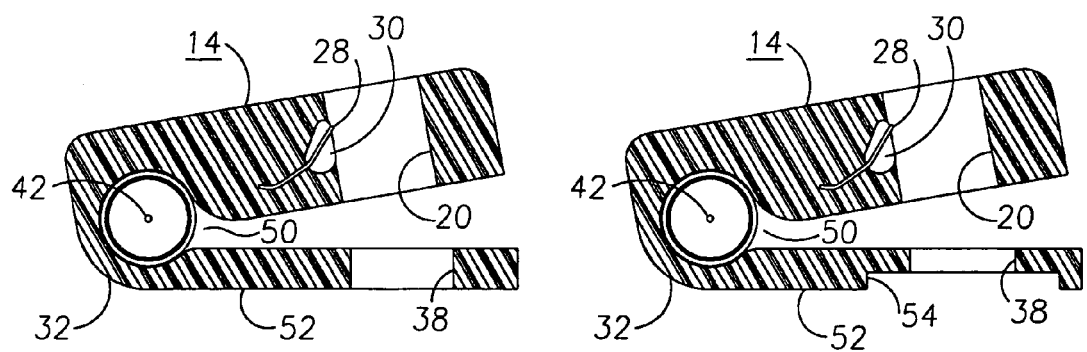
FIG. 5 is a cross-sectional view of the fastener shown in FIG. 4 without the recess.
FIG. 6 is a cross-sectional view of the fastener shown in FIG. 4 with the recess.

As shown in FIGS. 2 and 5, integrally formed to the major body portion 14 is a curvilinear portion 32, and extending from the curvilinear portion 32 is a pliable elongated flat base member 34. The base member 34 may be integrally formed with the major body portion 14, may be mechanically attached together, or may be secured by any other means. The major body portion 14, the curvilinear portion 32, and the base member 34 define an aperture 36 through which the cable or wire 12 is inserted. The flat base member 34 also includes a base member bore 38 that is disposed in axial alignment with the anchor bore 20 so that the anchor 22 can pass through both bores 20 and 38 for mounting the wire fastener 10 on the anchor 22. In addition, the pliable base member 34 facilitates the insertion of the wire 12 in the aperture 36 so that closing the base member 34 against the bottom surface of the major body portion 14 holds the wire 12 in the wire aperture 36. The wire fastener 10 of FIGS. 1–3 can be stacked on other wire fasteners 10 by aligning the anchor bores 20, and then sliding the wire fasteners 10, one after the other, on to the anchor 22.

For the various embodiments of this invention, the same reference characters will be used to designate like parts. In addition, like functions and like interactions of the parts among the various embodiments of this invention will not be repeated for each embodiment.

Referring to FIGS. 4–6 and using the same reference characters to define like parts, an alternative embodiment of the wire fastener 10 as illustrated in FIGS. 1–3 may be a wire fastener 40 having like parts as the wire fastener 10 and additionally having an aperture 50 for receiving and allowing the passage therethrough of the elongated material, such as a coaxial cable 42. The wire fastener 40 of FIG. 4 includes the major body portion 14, the curvilinear portion 32 and a base member 52, which has a thickness greater than the thickness of the base member 34. The major body portion 14 includes the anchor bore 20 extending therethrough so that an anchor 56 is positionable within.

Referring to FIG. 4 and using the same reference characters to define like parts, an alternative embodiment of the anchor 22 as illustrated in FIG. 1 may be an anchor 56 having like parts as the anchor 22 and additionally having a washer 58 or ring circumjacent the anchor shank between the first and second portions 23 and 24 for delimiting the penetration depth of the anchor 56 into the supporting structure. The anchor 56 may be secured into a wooden beam supporting structure 18, or other similar type of structure. As will be further described hereinbelow, the anchors may be driven into, drilled, screwed into, mechanically attached to, adhesively secured to, or any other suitable attachment means.

Referring to FIGS. 3, 4 and 6, the base member 34 has a recess 54 for receiving therein the washer or ring 58 of the anchor 56. Alternatively, the base member 34 may or may not have a recess 54. The recess 54 is preferable if any of the anchors has a washer or ring 58 for enabling the bottom surface of the base member 34 to be positioned adjacent to and flush with the supporting structure. If the base member 34 does not include the recess 54, then either the fastener can be used in combination with an anchor that does not include the washer or ring 58, or the fastener will can be used with an anchor that does include the ring 58, however, the ring 58 will jut against the bottom surface of the fastener.

The wire fastener 40 also includes the one-way anchor restraint prong 28 that is mounted within the interior annular surface of the anchor bore 20 and extends slightly into the anchor bore 20 for riding within the ring grooves 25 and for engaging the teeth 26 of the anchor 56 for preventing the wire fastener 40 from slipping or coming off the anchor 56. The anchor restraint flap 28 is preferably composed of spring steel or the like for allowing the placement of the wire fastener 40 on the anchor 56. The flap release passageway or hole 30 extends at least partially therethrough for registration with the anchor bore 20 so that a pry tool can be inserted into the passageway 30 for contacting and slightly moving the flap 28 so that the wire fastener 40 can be released from the anchor 56 should replacement or removal of the wire fastener 40 be desired. The wire fasteners 10 and 40 of FIGS. 1 and 4 are capable of being stacked one on top of another whereupon the anchor bores 20 of the wire fasteners 10 and 40 would be aligned with each other and with the anchor 22. The wire fasteners 10 and 40 would then be successively slipped on the anchor 22 creating a stacked arrangement of wire fasteners.

Figure 7:
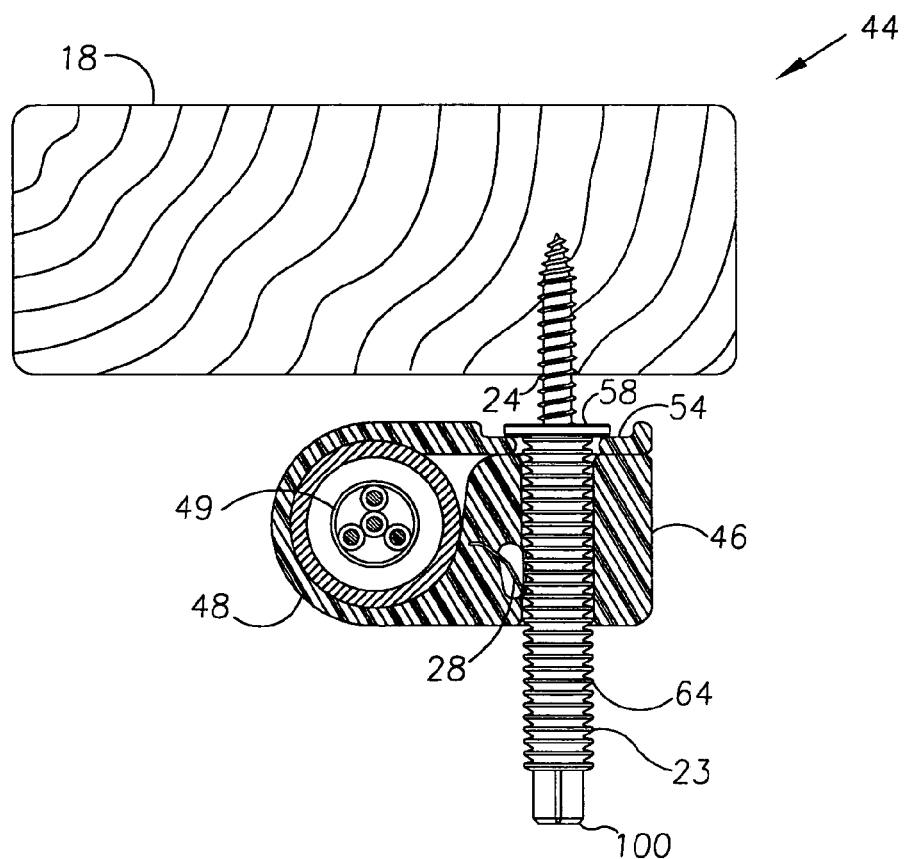
FIG. 7 is a cross-sectional view of yet another alternative embodiment of the fastener illustrating a major body portion having a curvilinear portion for holding different types of elongated materials and illustrating an anchor having a screw type end.
Figure 8:
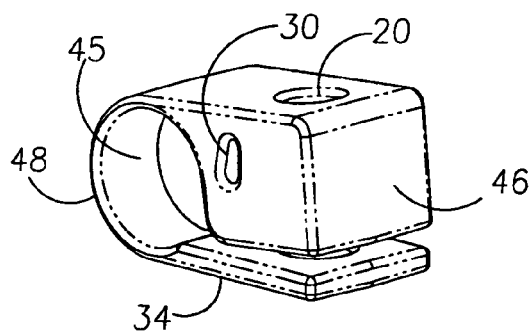
FIG. 8 is a perspective view of the fastener illustrated in FIG. 7 without having a recess in a base member.
Figure 9:
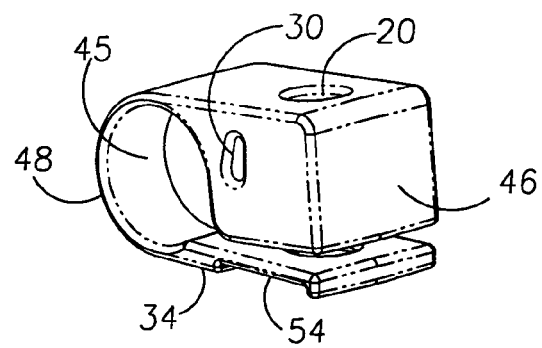
FIG. 9 is a perspective view of the fastener illustrated in FIG. 7 having the recess in the base member.

Referring to FIGS. 7–9 and using the same reference characters to define like parts, an alternative embodiment of the fasteners as illustrated in FIGS. 1–6 may be a fastener 44 having like parts as the other fasteners, such as the anchor bore 20, the base member 34, and the recess 54, and additionally having an aperture 45, a major body portion 46, and a curvilinear portion 48. As one example, as illustrated in FIG. 7, a 3 conductor wire 49 with ground may be supported within the aperture 45. The curvilinear portion 48 has a curved wall section for containing round wire, cable, tubing, etc. The base member 34 encloses the elongated material therein.

Referring to FIG. 7 and using the same reference characters to define like parts, another alternative embodiment to the anchors 22 and 56 may be an anchor 64 having the first portion 23 with the ring grooves 25 and the second portion 24 having a screw type end.

Referring to FIGS. 10–12 and using the same reference characters to define like parts, an alternative embodiment of the other fasteners 10, 40, or 44 as illustrated in FIGS. 1–9 may be a fastener 60 having like parts as the other fasteners, such as the major body portion 14, the anchor bore 20, the prong 28, the hole 30, and additionally having an aperture 62 for holding various types of elongated material. As illustrated in FIG. 10, the elongated material 61 is a piece of pipe. As illustrated in FIGS. 11 and 12, the aperture 62 is a U-shaped opening. Alternatively, the apertures 36, 45, 50, 62 and 84 may have any suitable shape or be any type of opening for holding various types of elongated material.

As illustrated in FIGS. 10, 11 and 12, the fastener 60 does not have the base member 34. All of the fasteners described herein may or may not have the base member 34. It may be desirable to have the base member 34 for some types of wires, pipes, etc. and undesirable to have the base member 34 for other types of wire, pipes, etc.

Figure 13:
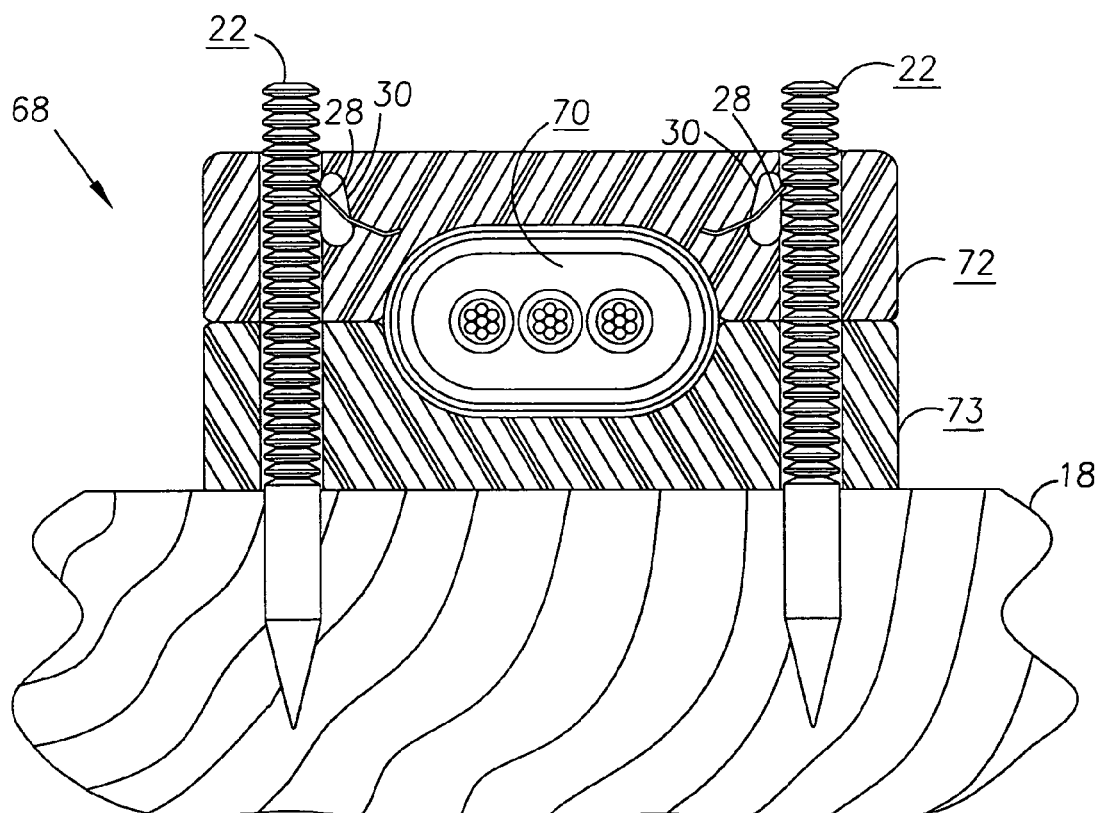
FIG. 13 is a cross-sectional view of another alternative embodiment of a fastener having a pair a U-shaped half body portions for securing heavy-duty cable and wire to the supporting surface.
Figure 14:
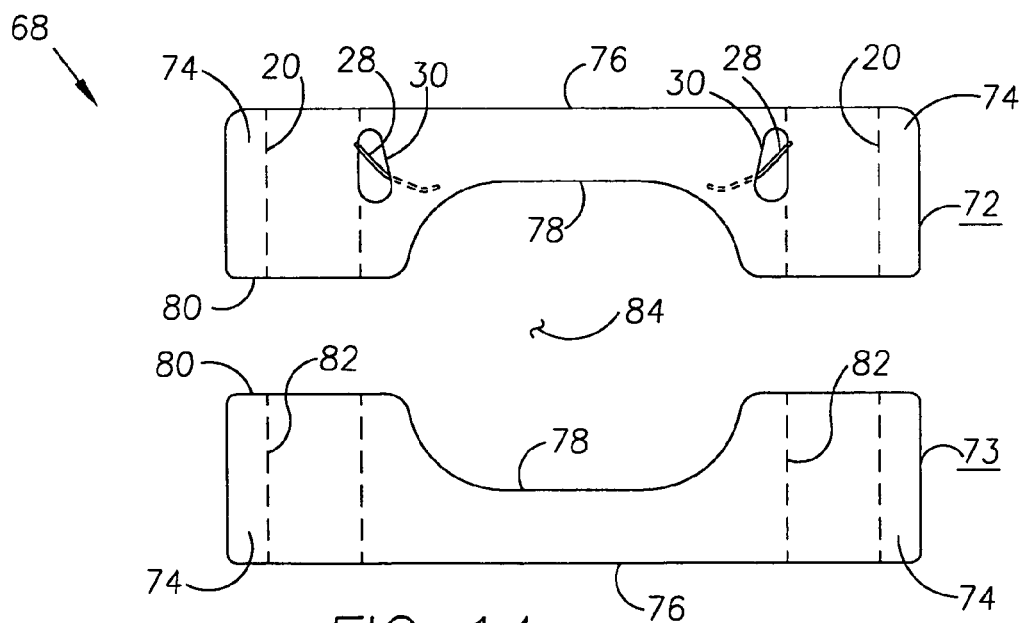
FIG. 14 is a side elevational view of the fastener of FIG. 13.

Referring to FIGS. 13 and 14 and using the same reference characters to define like parts, an alternative embodiment of the fasteners as illustrated in FIGS. 1–12 may be a fastener 68 having like parts as the other fasteners described herein and having a major body portion including a pair of U-shaped half body members. Specifically, the cable and electrical wire fastener 68 of FIG. 13 is most useful for holding and supporting heavy-duty cable and electrical wire 70. As one example, the wire 70 may be a 3 conductor wire, such as entrance cable. The pair of U-shaped half body members include a first half body member 72 and a second half body member 73. Each half-body member 72 and 73 includes a pair of opposed leg portions 74 interconnected by a bridging portion 76. The bridging portion 76 further defines an interior arcuate portion 78. Each leg portion 74 terminates with a flat bottom surface 80, and extending through each leg portion 74 is an anchor bore 82. When the flat bottom surfaces 80 of the leg portions 74 of both half body members 72 are brought into contact, a wire aperture 84 is formed for receiving, holding and allowing the extension therethrough of the elongated material, such as the heavy duty wire 70. The first half body member 72 has two anchor bores 20 and the second half body member 73 has two anchor bores 82, which are positioned so that both bores 20 and 82 can be axially aligned for each receiving the anchor 22.

At least one of the anchor bores 20 on the half body member 72 include the prong 28 that is mounted to the interior annular surface of the anchor bore 20 or mounted within the member 72 and partially juts into the hole 30 for abutting the anchor 22. The engagement of the prong 28 with the first body member 72 holds the half body member 72 to the anchor 22, and holds the second body member 73 securely between the support 18 and the first body member 72 for holding the wire 70 therein. Extending through the leg portion 74 is a flap release hole 30 that allows for the insertion of a pry tool to engage and slightly move the flap 28 so that the half body member 72 can be released from the anchor.

Figure 15:
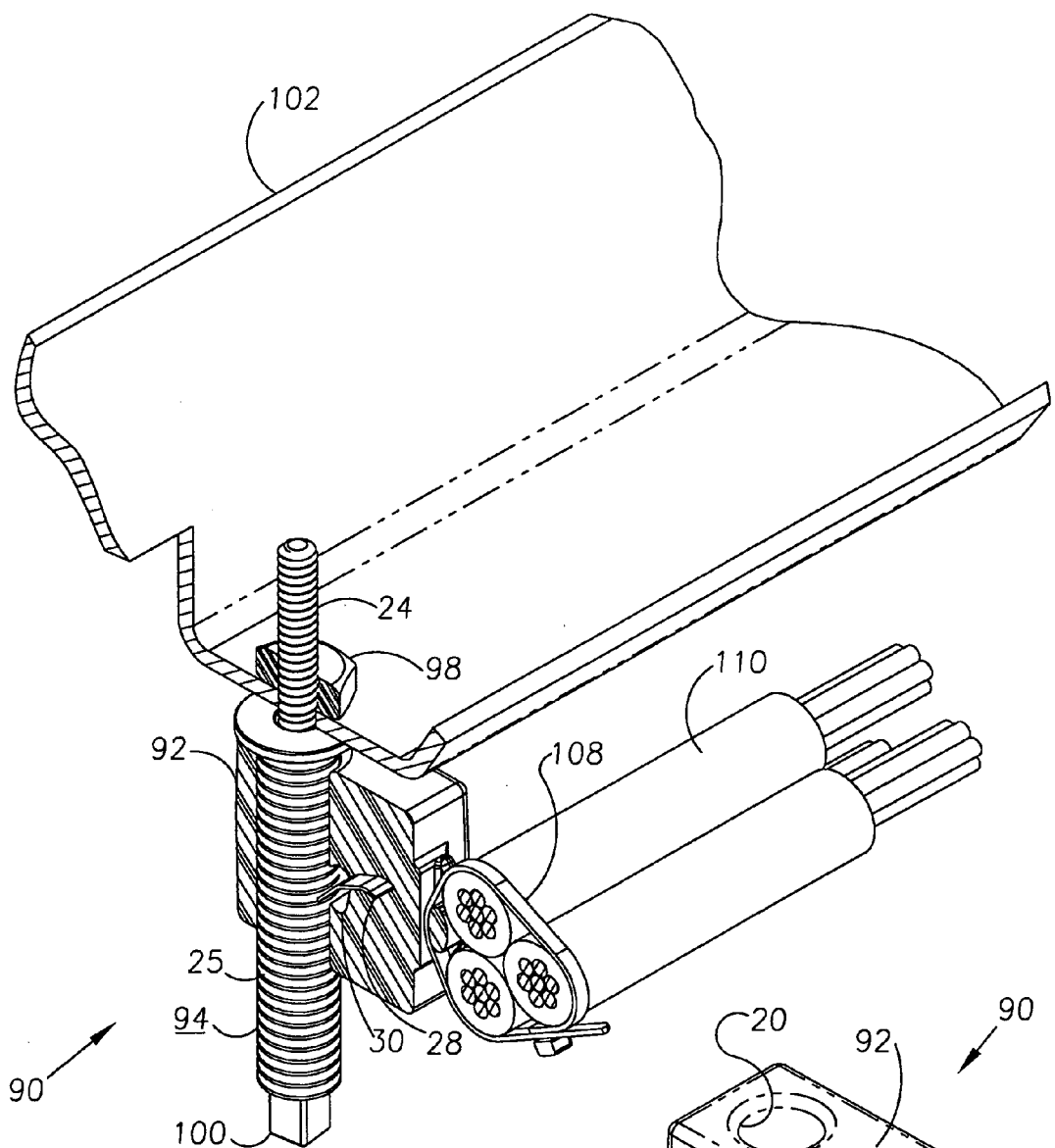
FIG. 15 is a cross-sectional view of a yet another alternative embodiment of the fastener illustrating the attachment of a wire tie to the fastener with a plurality of wires being held by the wire tie and illustrating an anchor having a bolt type end.
Figure 16:
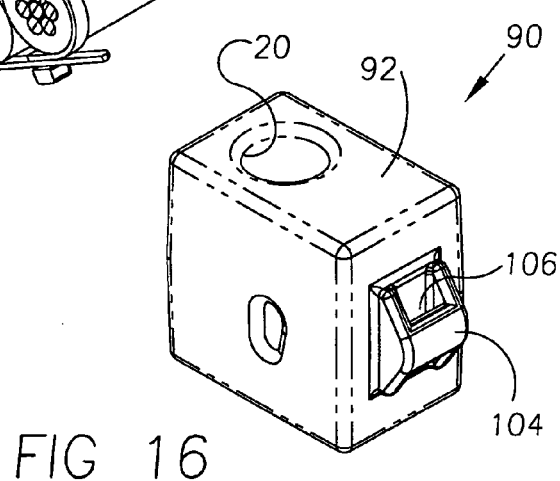
FIG. 16 is a perspective view of the major body portion of the fastener shown in FIG. 15.

Referring to FIGS. 15 and 16 and using the same reference characters to define like parts, an alternative embodiment of the fasteners described herein as illustrated in FIGS. 1–14 may be a fastener 90 having like parts as the other fasteners and additionally having a projection 104 and a slot 106. The major body portion of the fastener 90 of FIGS. 15 and 16 includes a main housing 92 that is generally square-shaped, and the main housing 92 includes the anchor bore 20 extending through the main housing 92. The one-way movement restraint flap 28 is mounted within the main housing 92, is mounted to the inner annular surface of the anchor bore 20, or the like, and slightly juts into the bore 20 for engaging an anchor. The release hole 30 extends into the main housing 92 and registers with the anchor bore 20 so that a pry tool can be inserted into the release hole 30 for slightly moving and lifting the flap 28 thereby disengaging the wire fastener 90 from the anchor 98. The main housing 92 includes the projection 104 which may be integrally formed on one side of the main housing 92, mechanically attached to the housing 92, or secured by any other suitable means. The projection 104 includes a slot 106. A wire tie 108, wrap, or any other device or securement member can be passed through the slot 106 so that the wire tie 108 can be joined at its ends thus forming a loop that supports and holds multiple cables or wires 110 that extend through and are held in place by the looped wire tie 108 as shown in FIG. 15.

Referring to FIG. 15 and using the same reference characters to define like parts, an alternative embodiment of the anchors described herein as illustrated in FIGS. 1, 4, and 7 may be an anchor 94, such a bolt-type anchor. The anchor 94 includes the ring groove portion 25 and the second portion 24 is a bolt integrally formed therewith, attached to, or otherwise secured to the first portion 23. A nut 98 may be threaded onto the threaded portion of the bolt for securing the anchor 94 to the supporting structure. Alternatively, the nut 98 may be integrally formed with the second portion 24. For illustrative purposes, the fastener 90 is shown as being mounted to a steel supporting structure 102 by the bolt-type anchor 94. As illustrated in FIGS. 7 and 15, the anchor may include a square or hex head 100 for enabling a tool (not shown) to rotate the anchor for securing the anchor to the supporting structure.

Referring to FIG. 17 and using the same reference characters to define like parts, an alternative embodiment of the anchors described herein as illustrated in FIGS. 1, 4, 7, and 15 may be an anchor 120 having like parts as the other anchors and having the first portion 23 with the ring groove 25 and having the second portion 24 with a weld material 122 welded onto the second portion 24 and to the supporting structure, such as a piece of steel 124. As illustrated in FIG. 17, the fastener 60 can be used to support a piece of conduit 126.

Referring to FIG. 19 and using the same reference characters to define like parts, an alternative embodiment of the anchors described herein as illustrated in FIGS. 1, 4, 7, 15 and 17 may be an anchor 130 having like parts as the other anchors and having the first portion 23 with the ring groove 25 and having the second portion 24 with a surface 132 that can be glued or adhesively attached to the supporting structure.

Figure 20:
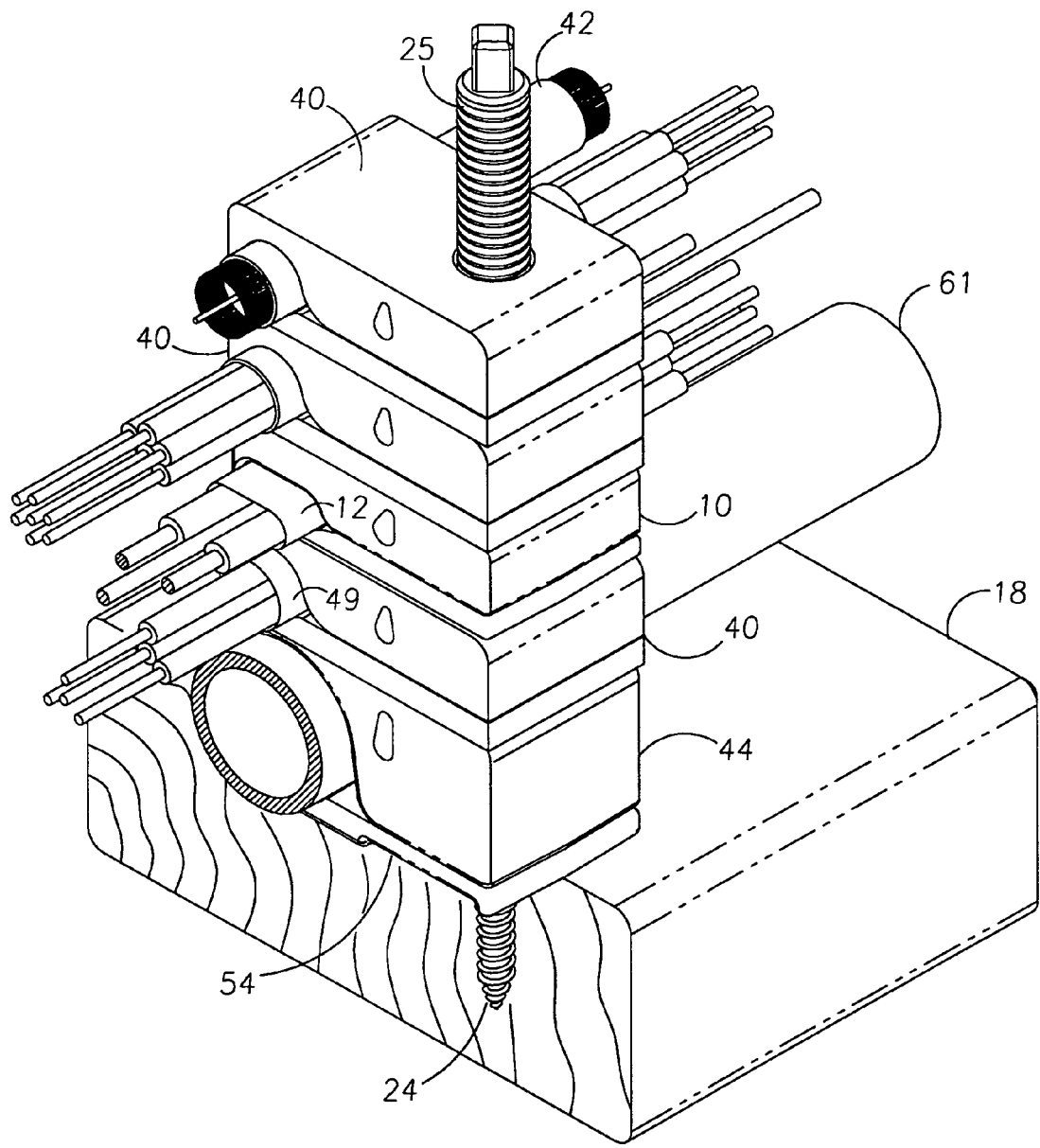
FIG. 20 is a perspective view of a plurality of different types of fasteners stacked on one another.

Referring to FIG. 20, an advantage of this invention is that different types of fasteners can be stacked on a single anchor to support multiple types of wires, cables, tubing, conduit, etc. Each of the fasteners can be slid onto an anchor previously attached to a supporting structure.

Additionally, as an alternative to the use of an anchor with ring grooves 25 engagable with the prong 28 as described hereinabove, any suitable device or design may be used for engaging the major body portion and the anchor.

In operation, one type of the anchors 22, 56, 64, 94, 120, or 130 is chosen to be secured to the supporting structure. A major body portion 14 of the fasteners 10, 40, 44, 60, 68, or 90 is selected according to the type of elongated material to be supported by the fasteners. A plurality of the anchors are secured to the supporting structure along the length of the supporting structure in spaced apart relationship. An elongated material to be supported by the fastener is slid into the aperture of the major body portion and the major body portion is slid onto the anchors, engaging the prong 28 with the teeth 26 of the anchor for holding the major body portion and the elongated material in position along the supporting structure.

Thus there has been shown and described several embodiments of a novel fastener and method for supporting an elongated material that fulfills all the objects and advantages sought therefore. Numerous changes, modifications, variations and other uses and applications of the subject invention will, nonetheless, become apparent to those skilled in the art after consideration of this specification together with the accompanying drawings and claims. All such changes, modifications, variations and other uses and applications that do not depart from the spirit and scope of the invention are deemed to be covered by the invention limited only by the following claims.

I claim:

1. A fastener mountable to a supporting structure for supporting an elongated material, comprising:
   an anchor having a first portion and a second portion, the second portion securable to the supporting structure;
   a major body portion having an anchor bore extending therethrough for allowing insertion of the anchor for securing the major body portion to the anchor, the anchor previously secured to the supporting structure, the major body portion having an aperture through which the elongated material passes for holding therein a portion of the elongated material that is disposed through the aperture; and
   a prong attached to the major body portion and extending at least partially into the anchor bore for engaging the first portion of the anchor upon insertion of the anchor through the anchor bore, for maintaining the anchor in place, and for substantially preventing withdrawal of the major body portion from the anchor so that the major body portion remains secured to the anchor.

2. The fastener according to claim 1, wherein the first portion of the anchor is a shank having ring grooves.

3. The fastener according to claim 2, wherein the ring grooves include teeth having a first flat surface and a second angled surface, the second angled surface for allowing the prong to slide over the second angled surface during disposition of the major body portion onto the anchor and the first flat surface for engaging the prong for preventing removal of the major body portion from the anchor.

4. The fastener according to claim 1, further comprising a flexible base member attached to the major body portion and covering the aperture of the major body portion for enclosing the aperture and holding therein the elongated material.

5. The fastener according to claim 4, wherein the base member further includes a recess for receiving the anchor.

6. The fastener according to claim 1, further comprising the major body portion having a prong release passageway extending at least partially through the major body portion for registration with the anchor bore so that the prong can be disengaged from the anchor by accessing the prong through the passageway for releasing the major body portion from the anchor.

7. The fastener according to claim 1, further comprising a plurality of fasteners stacked on each other so that the major body portion of one fastener abuts an adjacent major body portion having the anchor bores of the stacked fasteners being in axial alignment so that an anchor can be passed through the bores for securement to the supporting structure thereby maintaining the stacked disposition of the fasteners.

8. The fastener according to claim 1, further comprising the major body portion having a projection with a slot so that a securement member is insertable through the slot for wrapping about and holding a plurality of elongated materials.

9. The fastener according to claim 1, wherein the anchor further includes a washer attached to a shank of the anchor between the first and second portions of the anchor.

10. The fastener of claim 1, wherein the second portion of the anchor is a nail.

11. The fastener of claim 1, wherein the second portion of the anchor is a screw.

12. The fastener of claim 1, wherein the second portion of the anchor is a threaded bolt shank.

13. The fastener of claim 1, wherein the second portion of the anchor is glued onto the supporting structure.

14. The fastener of claim 1, wherein the second portion of the anchor is welded onto the supporting structure.

15. The fastener according to claim 1, wherein the major body portion comprises:
   a pair of U-shaped half body members with each half-body member having a bridging portion interconnecting a pair of opposed leg portions;
   each leg portion including a flat bottom surface and an anchor bore extending through the leg portion for registration with the flat bottom surface;
   the legs of two u-shaped half body members being aligned so that the flat bottom surfaces of the legs are in abutting relationship and the anchor bores are in axial alignment for defining a wire aperture between the legs and the bridging portions for holding the elongated material therein; and
   the legs of at least one half-body member including the prong that extends into the anchor bore for restricting movement of the half body member on the anchor.

16. A fastener mountable to a supporting structure for holding elongated material that extends through the fastener, comprising:
   an anchor having an elongated portion which is securable to the supporting structure;
   a major body portion having an anchor bore extending therethrough for allowing the anchor to pass therethrough so that the major body portion can be secured to the anchor, the major body portion having a curvilinear portion and an aperture for receiving and holding the elongated material;
   a one-way restraint prong that projects into the anchor bore so that the restraint prong allows the anchor to pass through the anchor bore as the major body portion is disposed on the anchor for securement to the supporting structure and for preventing the major body portion from slipping off of the anchor; and
   a pliable elongated base member coupled to the major body portion and extending to and covering the aperture of the major body portion so that the curvilinear portion and the base member encompass the aperture for confining and holding the elongated material therein.

17. The fastener of claim 16, further comprising the major body portion having a prong release hole extending at least partially therethrough for registration with the anchor bore so that the restraint prong can be disengaged from the anchor by access through the release hole.

18. The fastener of claim 16, wherein the anchor includes a shank having ring grooves and the prong is engagable with the ring grooves.

19. The fastener according to claim 18, wherein the ring grooves include teeth having a first flat surface and a second angled surface, the second angled surface for allowing the prong to slid over the second angled surface during disposition of the major body portion onto the anchor and the first flat surface for engaging the prong for preventing removal of the major body portion from the anchor.

20. The fastener of claim 16, wherein the elongated portion of the anchor is a nail.

21. The fastener of claim 16, wherein the elongated portion of the anchor is a screw.

22. The fastener of claim 16, wherein the elongated portion of the anchor is a threaded bolt shank.

23. The fastener of claim 16, wherein the elongated portion of the anchor is glued onto the supporting structure.

24. The fastener of claim 16, wherein the elongated portion of the anchor is welded onto the supporting structure.

25. The fastener according to claim 16, wherein the major body portion comprises:
- a pair of U-shaped half body members with each half-body member having a bridging portion interconnecting a pair of opposed leg portions;
- each leg portion including a flat bottom surface and an anchor bore extending through the leg portion for registration with the flat bottom surface;
- the legs of two u-shaped half body members being aligned so that the flat bottom surfaces of the legs are in abutting relationship and the anchor bores are in axial alignment for defining a wire aperture between the legs and the bridging portions for holding the elongated material therein; and
- the legs of at least one half-body member including a one-way restraint prong that extends into the anchor bore for restricting the movement of the half body member on the anchor.

26. The fastener of claim 25, further comprising each leg of the half-body member including the prong having a release hole extending at least partially therethrough for accessing the prong through the release hole for disengaging the prong from the anchor and allowing the removal of the half-body member from the anchor after both prongs are disengaged from both anchors.

27. The fastener of claim 16, further comprising a plurality of fasteners stacked upon each other for attachment to the supporting structure by one anchor that extends through the anchor bores of all the stacked fasteners.

28. A method of mounting an elongated material to a supporting structure, comprises the steps of:
- attaching a plurality of anchors to the supporting structure at various locations along the supporting structure;
- sliding a major body portion of a fastener onto each of the plurality of anchors by the insertion of the anchor into an anchor bore of the major body portion;
- inserting the elongated material through an aperture of the major body portion of the fastener; and
- engaging the major body portion of the fastener to the anchor by engagement of a prong that extends within the anchor bore of the major body portion with the anchor for securing the major body portion to the anchor for retaining the elongated material and mounting the elongated material to the supporting structure.

29. The method according to claim 28, further comprising the steps of stacking a plurality of fasteners upon each other for attachment to the supporting structure by one anchor that extends through the anchor bores of all the stacked fasteners.

30. The method according to claim 28, further comprising the steps of:
- sliding a wire tie through a slot formed on the main body portion of each fastener and then joining the ends of the wire tie so that the wire tie forms a closed loop; and
- enclosing at least one piece of elongated material through the loop of each wire tie.

31. The method according to claim 28, further comprising the step of enclosing the elongated material within a base member for containing the elongated material within the fastener.

* * * * *